(12) United States Patent
Theis et al.

(10) Patent No.: US 12,162,519 B2
(45) Date of Patent: Dec. 10, 2024

(54) BOARDING SYSTEM WITH A WALK-ON SEALING COVER

(71) Applicant: Gebr. Bode GmbH & Co. KG, Kassel (DE)

(72) Inventors: Christoph Theis, Bad Wildungen (DE); Abbas Rasekhi Coochesfahani, Kassel (DE)

(73) Assignee: GEBR. BODE GMBH & CO. KG, Kassel (DE)

( * ) Notice: Subject to any disclaimer, the term of this patent is extended or adjusted under 35 U.S.C. 154(b) by 890 days.

(21) Appl. No.: 17/236,217

(22) Filed: Apr. 21, 2021

(65) Prior Publication Data

US 2021/0331715 A1     Oct. 28, 2021

(30) Foreign Application Priority Data

Apr. 22, 2020 (DE) .................. 20 2020 102 238.5

(51) Int. Cl.
*B61B 1/02* (2006.01)
*E01F 1/00* (2006.01)

(52) U.S. Cl.
CPC . *B61B 1/02* (2013.01); *E01F 1/00* (2013.01)

(58) Field of Classification Search
CPC .......... B61D 23/00; B61D 23/02; B61B 1/02; E01F 1/00
See application file for complete search history.

(56) References Cited

U.S. PATENT DOCUMENTS

| | | | |
|---|---|---|---|
| 1,621,479 A | 3/1927 | Cleveland et al. | |
| 2,146,668 A | 2/1939 | Baade | |
| 2,522,674 A | 9/1950 | Heyerdahl | |
| 6,213,486 B1 * | 4/2001 | Kunz | B60R 3/02 280/166 |

FOREIGN PATENT DOCUMENTS

| | | |
|---|---|---|
| DE | 10151931 A1 | 5/2003 |
| DE | 102013017573 A1 | 4/2015 |
| JP | H0636927 A | 2/1994 |

* cited by examiner

*Primary Examiner* — Robert J McCarry, Jr.
(74) *Attorney, Agent, or Firm* — CANTOR COLBURN LLP

(57) ABSTRACT

A boarding system for a vehicle includes at least one pivotable sealing cover, which is pivotable from a walk-on first position into a non-walk-on second position, wherein the sealing cover is flush with an outer side of the vehicle in the non-walk-on second position.

6 Claims, 6 Drawing Sheets

BOARDING SYSTEM WITH A WALK-ON SEALING COVER

CROSS-REFERENCE TO RELATED APPLICATIONS

This application is related to and claims the benefit of German Patent Application No. 20 2020 102 238.5, filed on Apr. 22, 2020, the contents of which are herein incorporated by reference in their entirety.

TECHNICAL FIELD

The disclosure relates to a boarding system for a vehicle.

So far, the front region of sliding steps is usually sealed with sealing rubbers at the front edges of the sliding step (also referred to as extending portion or step), which are provided with a lip. In the closed state of the sliding step, the front edge of the sliding step with the sealing profile is flush with the external vehicle shell.

The sealing lip rests against the external vehicle shell and effects a seal. Because the seal rests against the external vehicle shell, the retracting distance of the sliding step is limited.

A walk-on stepping surface may happen to be located in the interior underneath the sliding step. Walking on the former is to be possible when the step is fully retracted.

SUMMARY

The disclosure provides an improved boarding system in which a walk-on stepping surface is provided underneath the sliding step in the interior region. Nevertheless, the door or external vehicle shell is supposed to be sealed in the closed state.

According to the disclosure, a boarding system is provided having the features of claim 1.

Accordingly, the boarding system comprises at least one pivotable sealing cover, which is pivotable from a walk-on first position into a non-walk-on second position, wherein the sealing cover is flush with the outer side of the vehicle in the non-walk-on second position.

Since it is supposed to be possible to walk on the inner vehicle-side tread underneath the step when the step is fully retracted, the sliding step of the step, when it is being retracted, passes through the sealing plane of the external vehicle shell and exposes the stepping surface or the vehicle floor panel situated thereunder, so that that region can be used as a tread.

According to the disclosure, this is realized by a sealing cover being positioned underneath the sliding step. In a basic or second position of the boarding system in a closed condition, the cover is flush with the external vehicle shell. In this case, the seal between the sliding step and the sealing cover is effected in a similar manner as in the previous prior art. Thus, the door opening of the vehicle is closed in the second or basic position by one or two door leaves, a front side of the sliding step and the substantially vertically oriented sealing cover.

In its basic position, the sealing cover thus assumes a substantially upright, vertically extending orientation, whereas in the first position, when the sliding step is retracted, it folds back in the direction of the vehicle interior and is disposed in a substantially horizontally extending manner, lying on the vehicle floor panel. In the folded first position, the sealing cover can be walked upon and serves as a stepping surface or a walk-on region of the step. The result is that height differences with respect to the train platform can be overcome. In that case, the boarding system has at least two treads making it easier for the users of the vehicle to enter or leave the vehicle.

When the sliding step fully retracts in order to expose the tread thereunder, the sealing cover thus pivots into the vehicle interior until coming to rest horizontally. Thus, the sealing cover becomes a walk-on part of the tread.

The sliding step or its drive unit controls the pivoting movement of the sealing cover. Preferably, this control can be realized by means of actuating levers provided with track rollers and guided in sliding step guide tracks. The actuating levers connect the sliding step with the sealing cover, so that the movement of the sliding steps is transmitted onto the sealing cover. In this case, the actuating lever can be hinged to the sealing cover via pivot joints, but preferably also via a guide track. In this case, the kinematic configuration permits both lowering or pivoting the sealing cover and raising it back into the basic position.

In a first embodiment, it may be sufficient to provide only a single actuating lever for the movement of the sealing cover; in a second embodiment, two actuating levers are provided that are in each case disposed laterally of the sealing cover and laterally of the sliding step, so that they do not constitute a tripping hazard.

In another position, the sliding step is extended from the vehicle in order to bridge a gap to a train platform, for instance. In this case, the sealing cover also remains in its basic position, i.e. substantially vertically oriented; the region of the door opening underneath the sliding step remains closed by the sealing cover. The tread located under the sliding step cannot be walked upon, because passengers step on the sliding step located above it.

BRIEF DESCRIPTION OF THE DRAWINGS

The enclosed Figures show a preferred embodiment. The individual technical components and elements shown do not necessarily have to be realized all together for an embodiment according to the disclosure. It is indeed possible to omit individual components and elements or replace them with other suitable components and elements.

In the Figures.

DETAILED DESCRIPTION OF THE DRAWINGS

Figure 1:
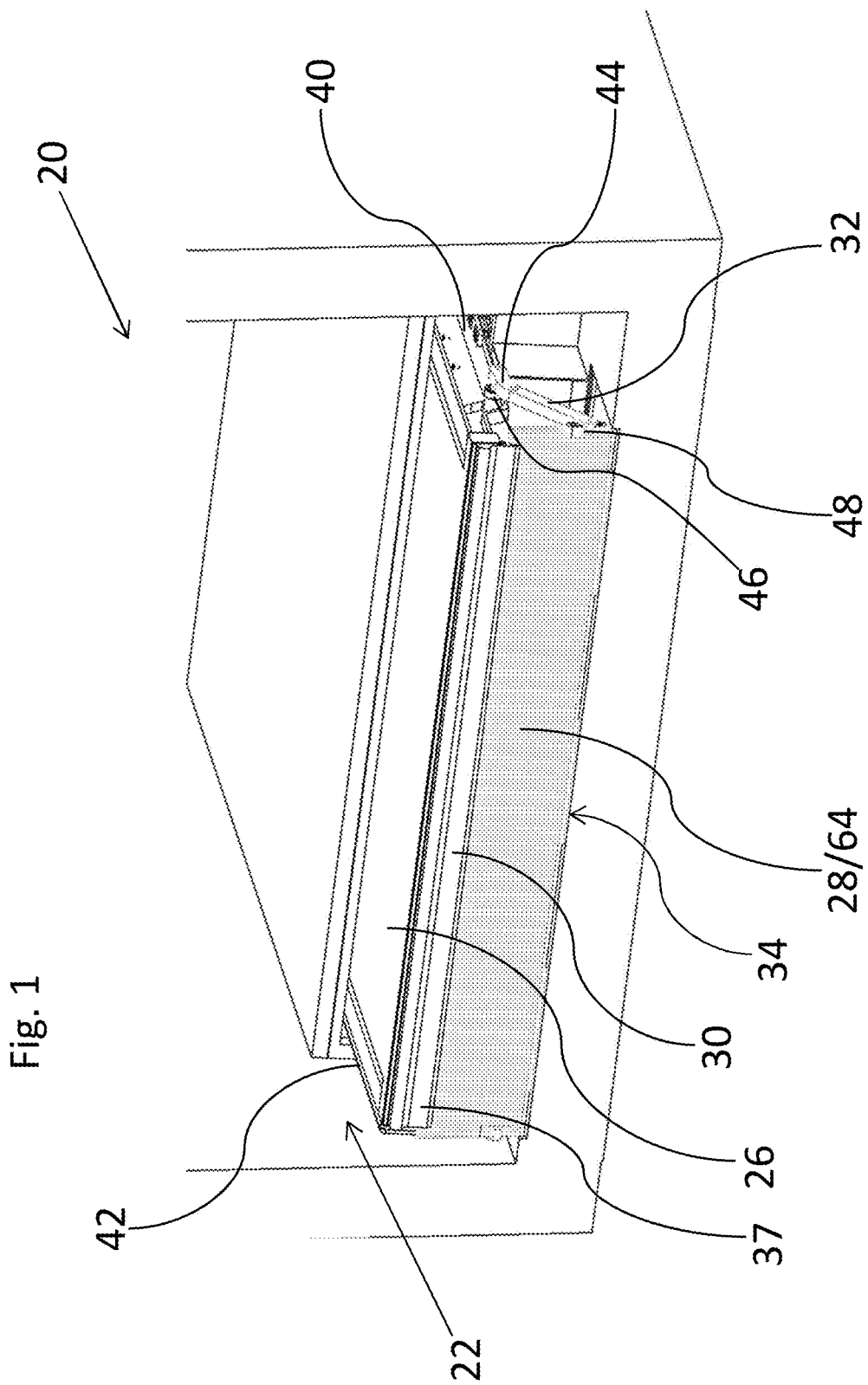
FIG. 1: shows a boarding system according to the disclosure with a closed sealing cover.

The following FIGS. 1 to 6 show a preferred embodiment of a boarding system 20 for a vehicle according to the disclosure. The boarding system 20 permits boarding a vehicle, which is not shown, preferably a rail vehicle or a bus, and is disposed in a door opening 22 of a door portal 24 in the lower walk-on region. The door opening 22 is closed and opened by a door or door leaf that is also not shown.

An extendable sliding step 26 is provided for making it easier to board and/or for bridging a gap, e.g. to a train platform. The door, which is not shown, closes the region of the door opening 22 above the sliding step 26. A sealing cover 28, which closes the region of the door opening 22 located underneath the sliding step 26, is disposed underneath the sliding step 26. In the closed position of the door and when the sliding step 26 is retracted into a basic or second position, the door opening 22 is thus substantially closed by the door, a front side 30 of the sliding step 26 and the sealing cover 28. This is apparent especially from FIGS. 1 and 2.

In FIG. 1, the door opening 22 and the door portal 24 are depicted wider than the sliding step 26. The resulting gap is closed with a sealing frame that is not depicted. Alternatively, the sealing cover 28 may have about the same width as the sliding step 26.

Figure 2:
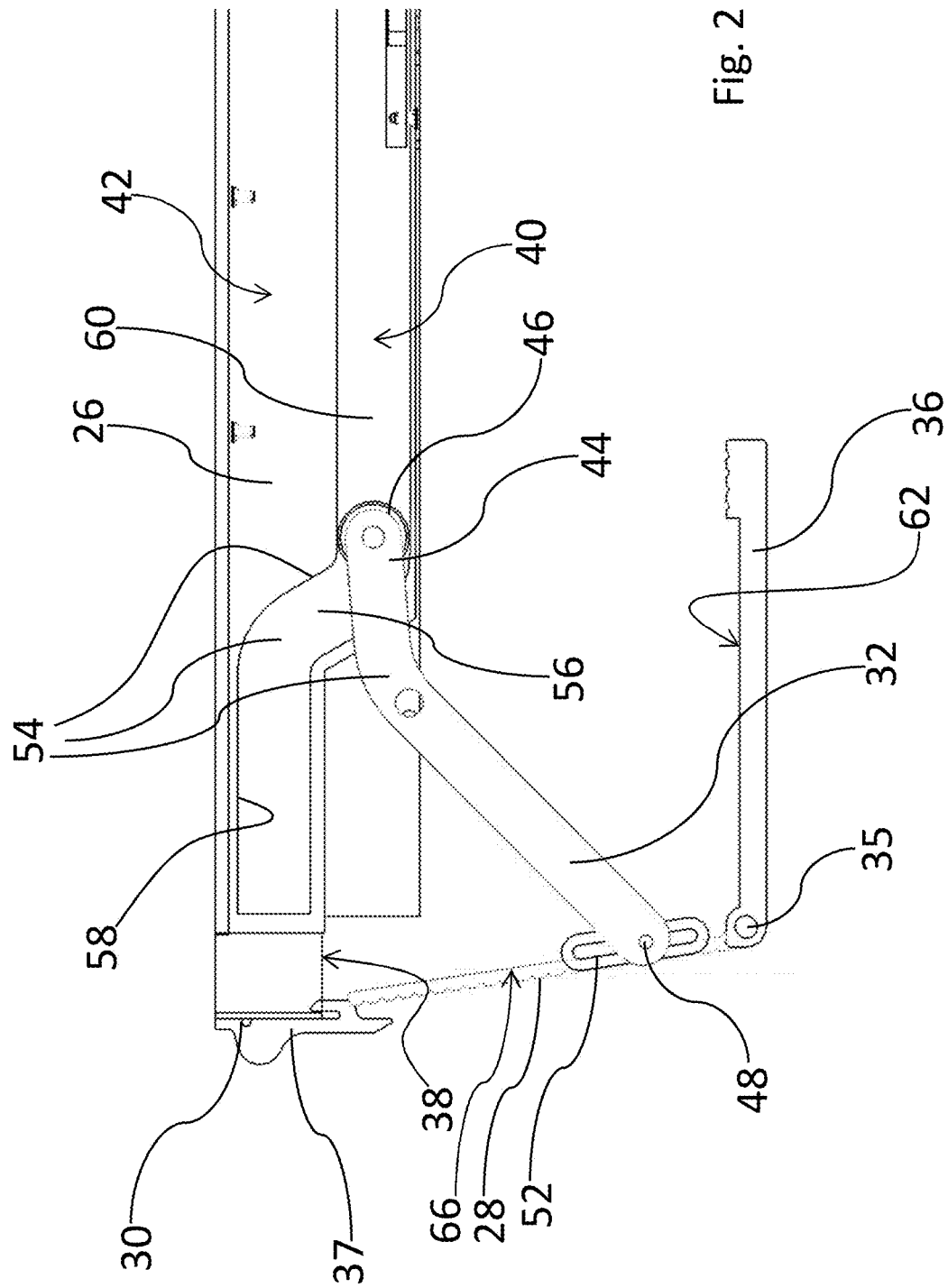
FIG. 2: shows the boarding system from FIG. 1 in a side view.
Figure 3:
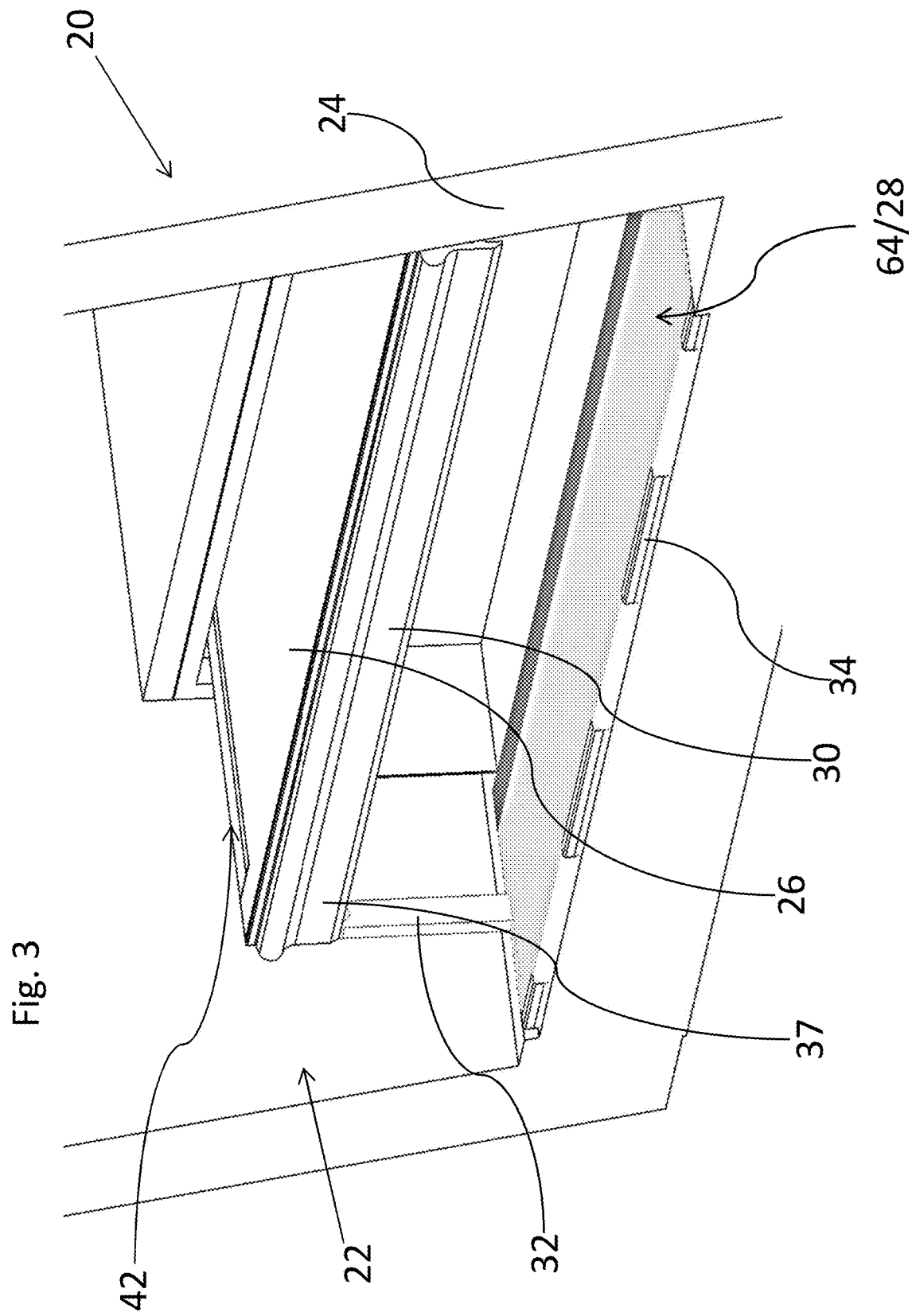
FIG. 3: shows the boarding system with an opened position of the sealing cover.
Figure 4:
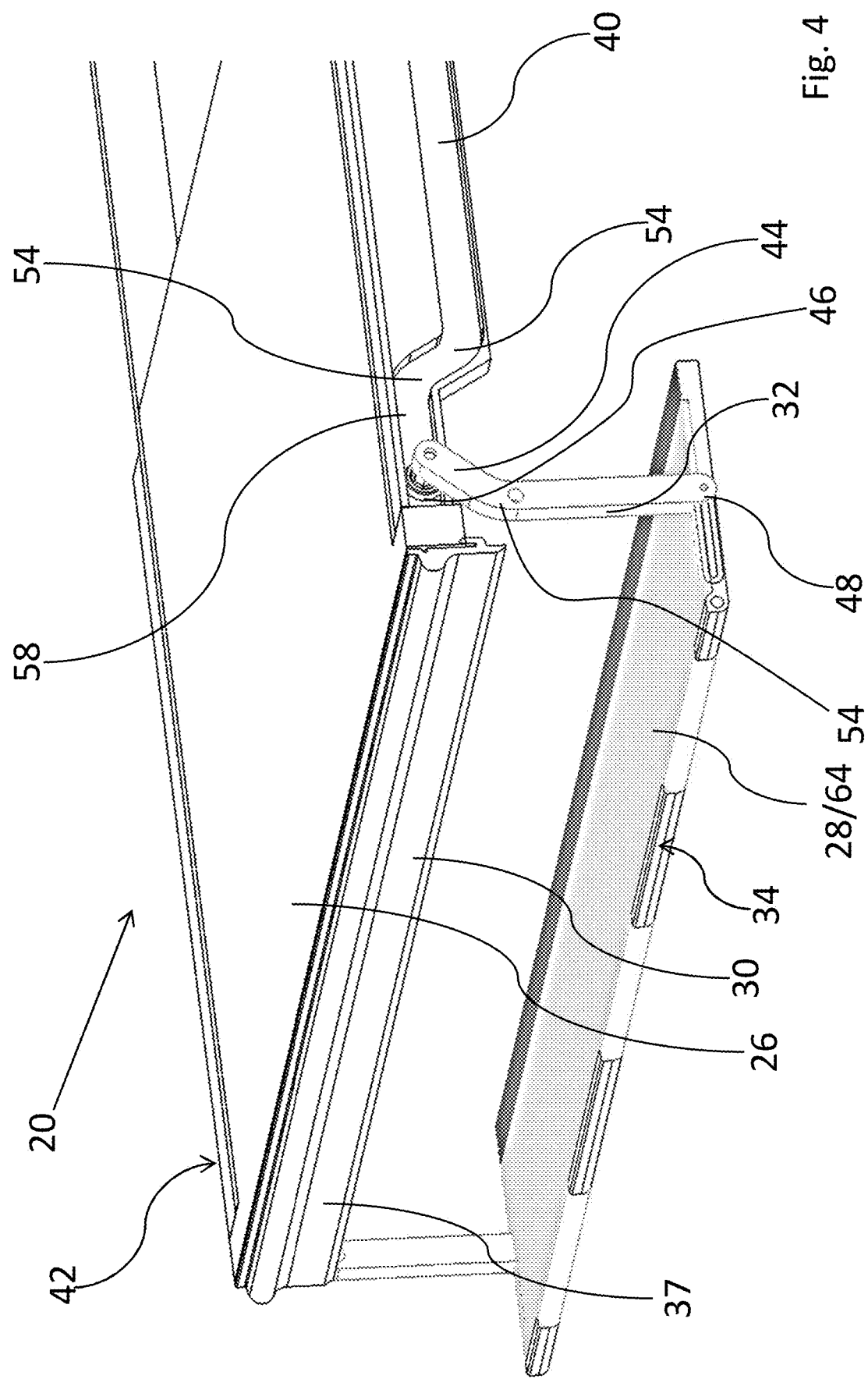
FIG. 4: shows the boarding system according to FIG. 3 in a perspective side view.
Figure 5:
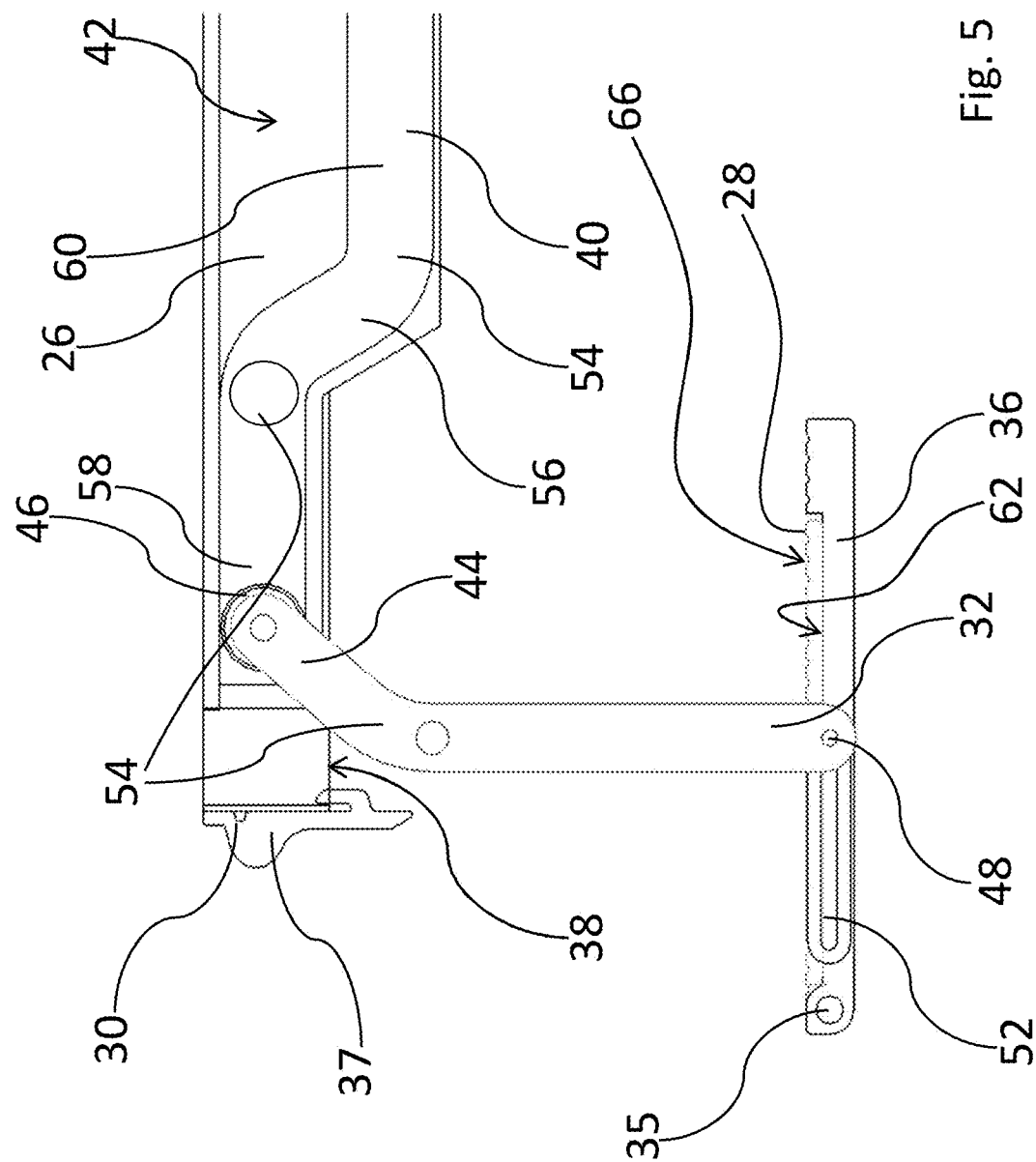
FIG. 5: shows the boarding system according to the FIGS. 3 and 4 in a side view.

FIG. 2 illustrates the essential components of the boarding system according to the disclosure 20 in a side view. The door portal 24 and also the door are not shown. The boarding system 20 is in the basic position in which the door opening 22 is closed and the vehicle is ready to drive. It is apparent, in particular, that the sealing cover 28 is connected to the sliding step 26 via an actuating lever 32. The sealing cover 28, with its underside 34 that faces towards an underground of the vehicle, is hinged to a vehicle floor panel 36 via a joint 35. Thus, the sealing cover 28 can be pivoted both into the vehicle interior and out of the vehicle via its underside 34, which substantially extends across the width of the door opening 22.

FIG. 2 also illustrates that, in the basic position, the front side 30 of the sliding step 26 at a sliding step underside 38 produces a sealing effect against the sealing cover 28 by means of a seal 37.

The depicted actuating lever 32 is movably guided in a sliding step guide track 40. The sliding step guide track 40 extends in the extending direction of the sliding step 26 along an outer face of the sliding step 42; it is preferably recessed into the latter as a groove. At its free sliding step end 44, the actuating lever 32 comprises a guide roller 46 via which the sliding step end 44, and thus the actuating lever 32, is movable in the sliding step guide track 40.

With its opposite free sealing cover end 48, the actuating lever 32 is connected to the sealing cover 28. The sealing cover end 48 can also be moved along the sealing cover 28 over a certain section. For this purpose, the sealing cover 28 has a sealing plate guide track 52 in which the sealing cover end 48 of the actuating lever 32 is guided, preferably also by means of a guide roller that is not shown.

Both the sliding step guide track 40 and the actuating lever 32 are not straight along their course, but have curves 54. The actuating lever 32, due to its curve 54, is configured in a manner bent away from its straight line, in the direction of the vehicle interior. The sliding step guide track 40 has two curves 54 bent in opposite directions, so that the result is a kind of S-shaped region 56 along the course of the sliding step guide track 40. Thus, starting from the front side 30 of the sliding step 26, the sliding step guide track 40 has a first straight section 58 that transitions into the S-shaped region 56. Over the further course, the S-shaped region 56 then transitions into a second straight section 60.

The vehicle floor panel 36 has a depression 62 whose depth approximately corresponds to the thickness of the sealing cover 28, so that the latter can be pivoted into the depression 62. Thus, the sealing cover 28, with its walk-on walking surface 64, can be flush with the vehicle floor panel 36 and, in the embodiment shown, forms a stepping surface for passengers together with surrounding areas of the vehicle floor panel 36.

In the embodiment shown, the sealing cover guide track 52 is disposed at a lateral edge 66 of the sealing cover 28, which extends vertically in the basic position, and can also be pivoted into the depression 62 of the vehicle floor panel 36 together with the sealing cover end 48 of the actuating lever 32.

Figure 6:
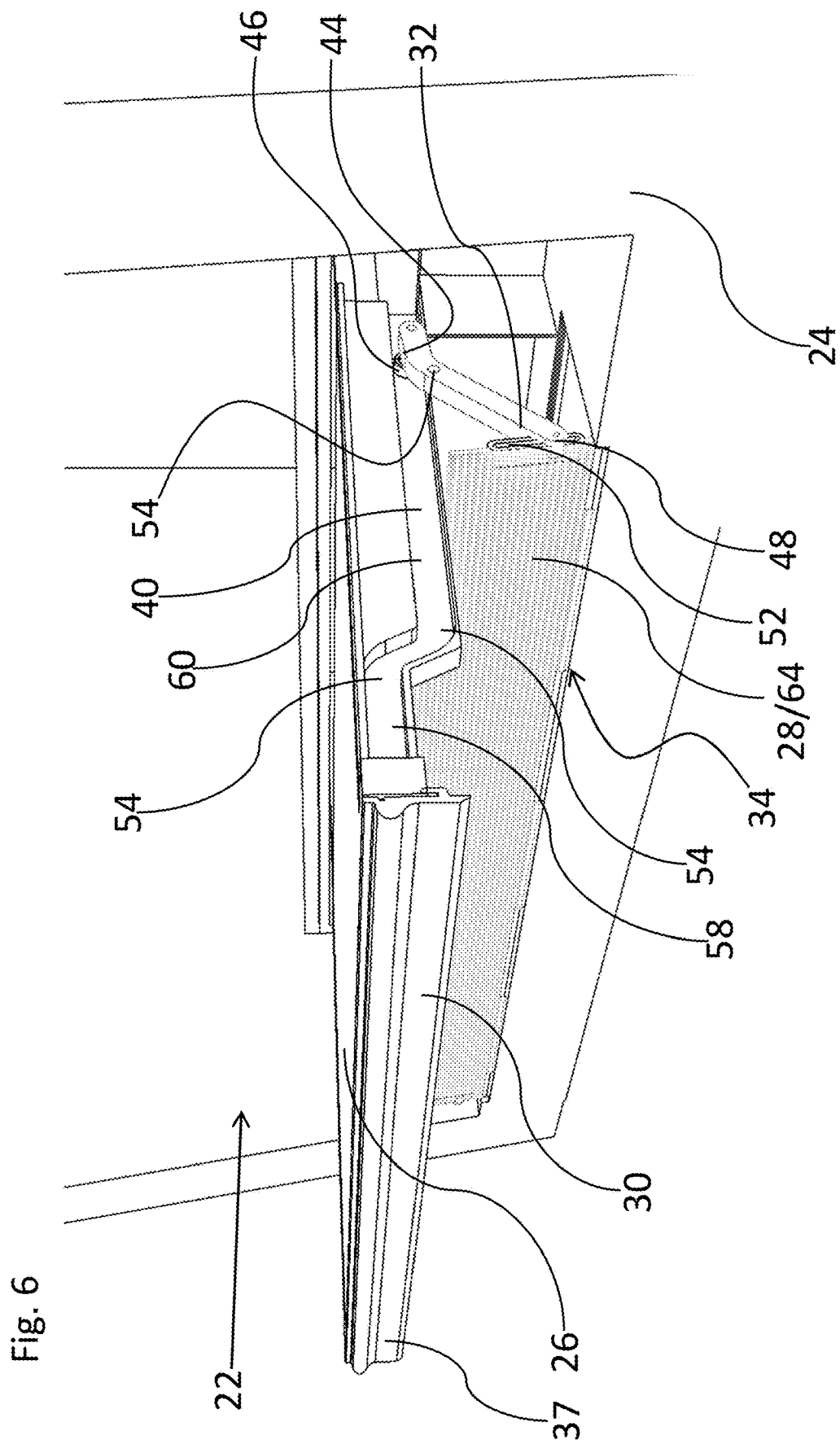
FIG. 6: shows the boarding system with a fully extended sliding step.

FIGS. 1-6 illustrate the fundamental different positions of the sliding step 26, the sealing cover 28 and the components connected therewith. FIGS. 1 and 2 show the basic or second position of the boarding system 20, FIGS. 2 to 5 show a walk-on or first position of the sealing cover 28 with a partially retracted sliding step 26, and FIG. 6 shows an extended sliding step 26 while the sealing cover 28 is closed; in this position, the vehicle floor panel 36 located thereunder cannot be walked upon.

The sealing cover 28 is driven by the movement of the sliding step 26; depending on the movement of the sliding step 26, it automatically moves into the intended positions or locations. For example, FIG. 6 shows that, in the position with the extended sliding step 26, the door opening 22 underneath the sliding step 26 remains closed due to the sealing cover 28, whereas the sealing cover 28, in the walk-on position or location according to the FIGS. 3-5, pivoted into the vehicle interior and disposed in the depression 62 of the vehicle floor panel 36.

The invention claimed is:

1. A boarding system for a vehicle, comprising: at least one pivotable sealing cover, which is pivotable from a walk-on first position into a non-walk-on second position, wherein the sealing cover is flush with an outer side of the vehicle in the non-walk-on second position, wherein the sealing cover is connected to the sliding step via at least one actuating lever, and a movement of the sliding step drives a movement of the sealing cover via the at least one actuating lever, wherein the at least one actuating lever is movably guided in a sliding step guide track and a sealing cover end of the at least one actuating lever is guided in a sealing plate guide track.

2. The boarding system according to claim 1, wherein the at least one actuating lever has a guide roller at a free sliding step end, the guide roller being guided in the sliding step guide track.

3. The boarding system according to claim 1, wherein the sealing cover has an underside that faces towards an underground of the vehicle, is hinged to a vehicle floor panel such that it can be pivoted both into the vehicle interior and out of the vehicle.

4. The boarding system according to claim 1, wherein the sliding step guide track and the at least one actuating lever have curves along their course.

5. The boarding system according to claim 4, wherein the at least one actuating lever, due to the curve, is configured such that the at least one actuating lever is bent away from its straight line, in the direction of the vehicle interior in the second position.

6. The boarding system according to claim 4, wherein the sliding step guide track has two curves bent in opposite directions, resulting in an S-shaped region along the course of the sliding step guide track.

* * * * *